United States Patent
Bulfer et al.

(12)

(10) Patent No.: US 6,175,858 B1
(45) Date of Patent: Jan. 16, 2001

(54) INTELLIGENT NETWORK MESSAGING AGENT AND METHOD

(75) Inventors: Andrew Frederick Bulfer, Mountain Lakes; Bruce Lowell Hanson, Little Silver; Robert F. Mortenson, Chatham; Steven Charles Salimando; Peter H. Stuntebeck, both of Little Silver; Roy Philip Weber, Bridgewater, all of NJ (US)

(73) Assignee: AT&T Corp., New York, NY (US)

( * ) Notice: Under 35 U.S.C. 154(b), the term of this patent shall be extended for 0 days.

(21) Appl. No.: 09/114,706

(22) Filed: Jul. 13, 1998

(51) Int. Cl.[7] .................................................. G06F 13/00
(52) U.S. Cl. ............................................................ 709/206
(58) Field of Search ........................ 364/DIG. 1, DIG. 2; 709/200, 206, 219, 224, 229

(56) References Cited

U.S. PATENT DOCUMENTS 4,837,798   6/1989   Cohen .
4,935,954   6/1990   Thompson et al. ................... 379/89
5,479,491   12/1995  Herrero Garcia et al. .
5,956,486 * 9/1999   Hickman ............................. 709/206

FOREIGN PATENT DOCUMENTS 0627837A   12/1994   (EP) .

* cited by examiner

Primary Examiner—Robert B. Harrell

(57) ABSTRACT

A method and system for consolidating multiple mailboxes into a single universal mailbox. The system comprises an agent, a user database, an application database and a mail repository. The agent searches a user database to determine the list of messaging systems the user subscribes to. The agent then recalls from the application database the procedures for accessing the messaging systems and logs onto each messaging system in turn to retrieve any new messages. The agent notifies the user of new messages according to a predefined notification method.

30 Claims, 2 Drawing Sheets

INTELLIGENT NETWORK MESSAGING AGENT AND METHOD

BACKGROUND OF THE INVENTION

1. Field of the Invention

This invention relates to messaging systems and, in particular, a system and method for retrieving and consolidating messages from various messaging services.

2. Description of the Related Art

Presently, many voice-mail and e-mail users have multiple accounts for each type of messaging service, for example, e-mail accounts with at least one internet service provider, and one or two business e-mail and voice-mail services. These e-mail and voice-mail services are usually stored in separate mailboxes in different messaging services. In order to retrieve messages, send messages, reply or conduct other business, users must access each individual mailbox in turn. These mailboxes typically have different access methods, different devices, different authentication procedures, different feature sets, and different user interfaces.

Attempts have been made to create a unified messaging system that provides for a single electronic mailbox for different types of messages. These attempts have been limited to a premise-based exchange ("PBX") which interconnects digital telephones and personal computers. A PBX typically provides voice messaging service and electronic mail messaging service. Attempts have been made to route new messages from the internal voice messaging service and electronic mail messaging service to a system processor within the PBX thus consolidating a user's messages within the PBX. Such attempts to create a unified messaging system may work within a PBX where all activities occur within one switching system; however, such a premise-based messaging system has no means for detecting messages that are external to the PBX, nor does a premise-based messaging system have the capability of retrieving messages from external messaging services. Thus, users must still periodically log onto each external mailboxes to check whether or not that system has any messages for the users.

It is therefore desirable to have an intelligent network messaging agent that is capable of polling various messaging services a user subscribes to, retrieving all new messages, saving the new messages in a single mail repository for a later retrieval by the user, and notifying the user of the new messages.

SUMMARY OF THE INVENTION

The present invention features a method and system for retrieving and consolidating messages from various messaging services that are independent from one another.

In one aspect, the invention features a method of retrieving messages from a predefined list of messaging systems on behalf of a user comprising the steps of retrieving a message from a predefined messaging system, storing the message in a single repository, and notifying the user of the presence of the message in the single repository.

In another aspect, the invention features a system for retrieving messages from a predefined list of messaging systems on behalf of a user including a means for retrieving a message on behalf of a user from a predefined messaging system, a means for storing the message in a single repository, and a means for notifying the user of the presence of the message in the single repository.

DETAILED DESCRIPTION OF THE PREFERRED EMBODIMENT

Figure 1:
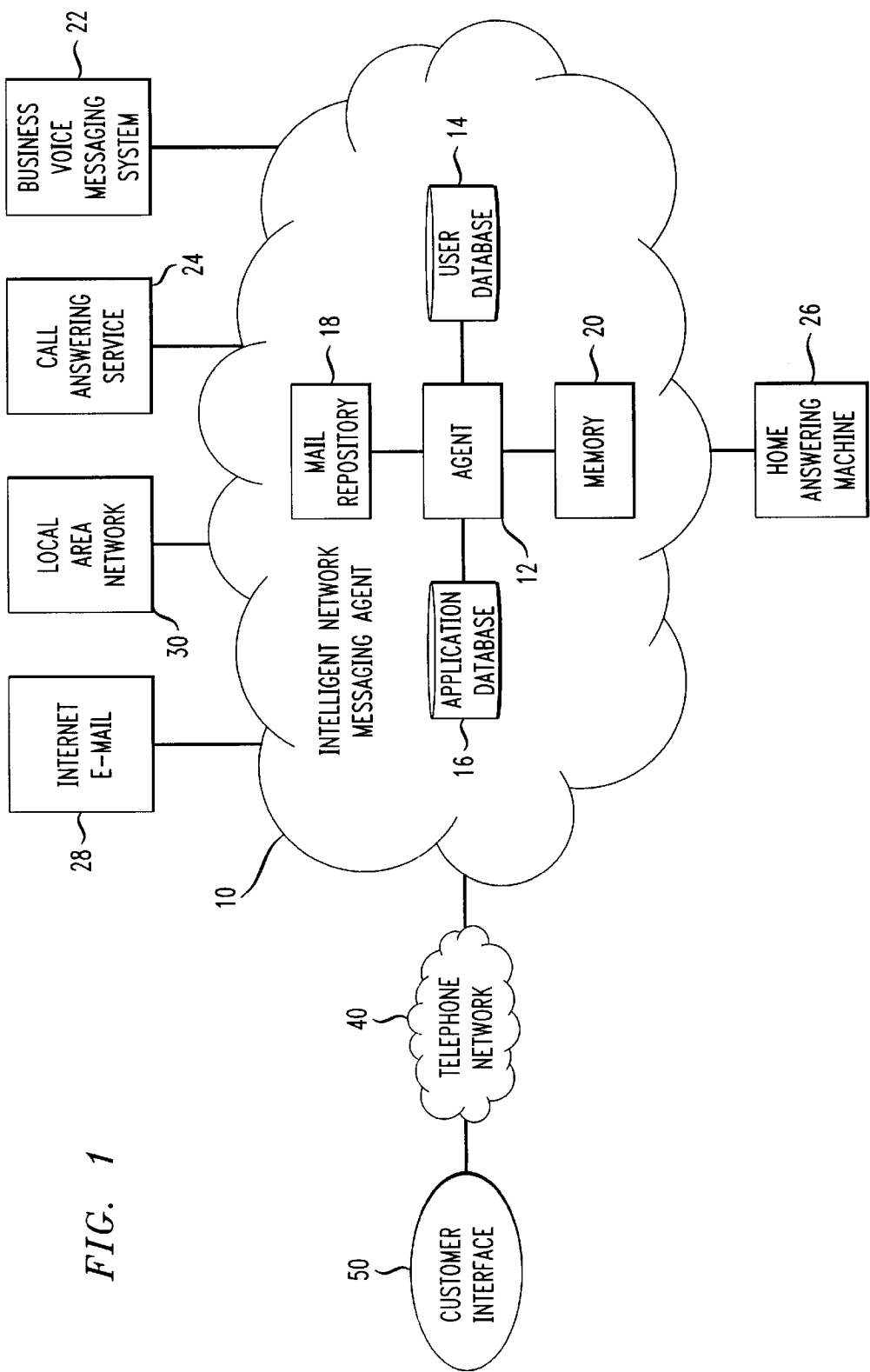
FIG. 1 is a block diagram of a preferred embodiment of an intelligent network messaging agent in accordance with the present invention.

FIG. 1 shows a simplified intelligent network messaging agent suitable for use in accordance with an embodiment of the present invention. The intelligent network messaging agent is an independent network, not a part of a built-in, premise-based exchange system.

As shown in FIG. 1, the preferred embodiment of the present invention of an intelligent network messaging agent 10 comprises an agent 12, a user database 14 and an application database 16, each of which will now be described in greater detail below.

At the center of the intelligent network messaging agent 10 is an agent 12 which is capable of retrieving messages from various types of messaging services on behalf of a user. The agent 12 is a server having applications that can perform an action or bring about a certain result on behalf of a user or another agent. The use of agents in computer networks to accomplish specific tasks are well-known.

The agent 12 maintains a user database 14 containing user records including a list of messaging services subscribed to by each user and the preferred polling interval. This information may be specified by the user or, alternatively, may be obtained by observing specific messaging services a user engages with during a session.

The agent 12 also maintains an application database 16 comprising a library of protocols including the various accessing methods, authentication procedures, and feature sets required to interact with various messaging systems.

The application database 16 should include protocols to access business voice messaging systems 22, call answering services 24, and home answering devices 26 that have remote retrieval capability. The application database 16 should further include protocols to various e-mail systems, such as internet mail 28 via an internet service provider and business/enterprise e-mail service via a local area network 30.

During a polling session, the agent 12 logs on to each messaging service listed in a user's record and retrieves all new messages. The agent 12 then deposits the retrieved messages in the user's mailbox in the mail repository 18. Each user of the intelligent network messaging agent has a personal mailbox in the mail repository 18. After retrieving a new message, the agent 12 would notify the user of the new messages.

The agent 12 may notify the user by paging the user or calling the user at a designated number. Alternatively, the agent 12 may also leave a notification message in each of the polled mailboxes. Thus when the agent 12 finds new messages in an individual source system, it would retrieve the messages, integrate them into the user's mailbox in the mail repository 18, delete the messages from the source system, and then leave a single message on the source system. The notification message may include the time and date when the message was retrieved, and the mailbox from which the message was retrieved. The notification message will trigger the message waiting notification capabilities of the source system. The agent 12 will instruct its memory 20 that a message has been retrieved and to leave an identical message in the other mailboxes. Once users retrieve their messages from the mail repository 18, the agent 12 will deactivate the notification by accessing each source system and deleting the notification message.

A user can access the intelligent network messaging agent 10 through a telephone network 40 using a suitable customer interface 50, which can be a voice access such as a touch-tone telephone or an on-line access such as a computer. It is known in the art as to how to adapt the intelligent network messaging agent to allow a user to connect to the system through any conventional telephone network, such as the public switched telephone network or premise-based telephone network.

By voice access, users will be able to select how messages are sorted and presented; navigate through the message list; listen to the headers and addressee lists of all messages, both voice and e-mail, using text-to-speech capabilities; listen to individual voice mail messages; listen to text-to-speech versions of e-mail messages; save or delete individual messages in the mail repository; and forward or reply to individual voice mail messages with delivery either immediately or at a scheduled later time.

By computer interface, users will be able to select how messages are sorted and presented; navigate through the message list; review the headers of all messages; retrieve and read e-mail; retrieve and playback voice messages using the sound card and the player capabilities of the computer system; save or delete individual messages in the mail repository; forward or reply to individual e-mail messages; and forward or reply to individual voice mail messages with delivery either immediately or at a scheduled later time.

In sum, the intelligent network messaging agent would utilize an agent that would act on the user's behalf to retrieve both voice and e-mail messages from each individual source, integrate them, present them in a single mailbox, and enable the same kinds of features (and perhaps more) available in the individual mailboxes.

Figure 2:
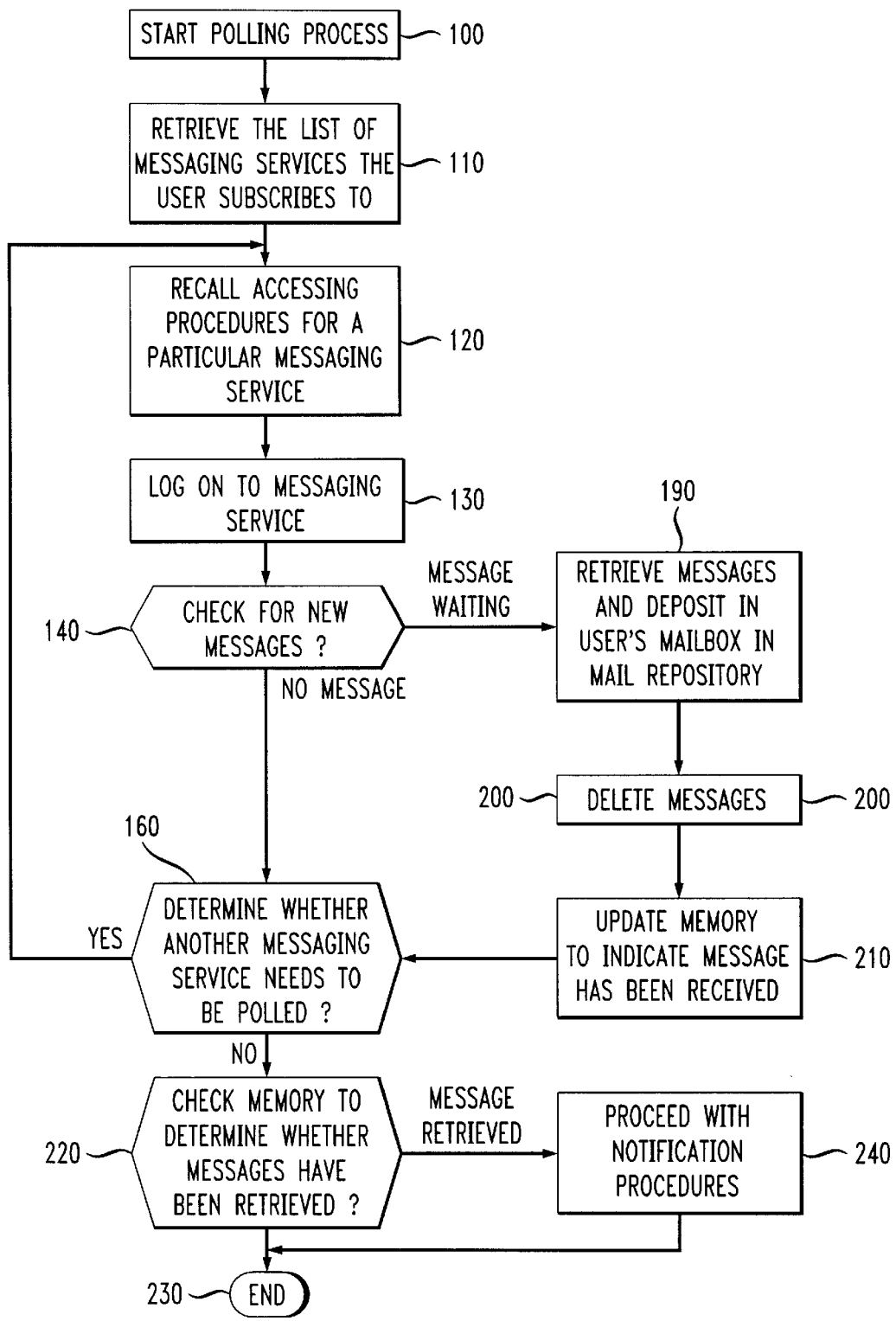
FIG. 2 is a flowchart depicting the steps involved in retrieving messages from various messaging services on behalf of a user according to the preferred embodiment of the present invention.

Referring to FIG. 2, there is illustrated a flowchart of the preferred method of using the system illustrated in FIG. 1. In step 100, the system starts the polling routine. Initially in step 110, the agent 12 searches the user database 14 to determine the list of messaging services the user subscribes to. In step 120, the agent recalls from its application database 16 the procedures for accessing the first messaging system on the list. In step 130, the agent logs onto the first messaging service. It then checks for new messages, step 140. If there are no new messages, the system proceeds to step 160. If a new message is detected, agent 12 would retrieve the message by executing the proper command and deposit that message in the user's mailbox in the mail repository 18, step 190. After retrieving the message, the agent 12 would delete the message from the mailbox, step 200, and update its memory to indicate that a new message has been retrieved, step 210. Having completed its polling routine at this messaging service, the system proceeds to step 160.

At step 160, the agent 12 reviews the list of messaging services subscribed to by the user to determine whether another messaging service needs to be polled. If another messaging services still needs to be polled, the system returns to step 120, i.e, recalling accessing procedures for that particular messaging system. The polling process is repeated until the agent 12 determines at step 160 that all messaging services have been polled.

At step 220, the agent 12 checks memory 20 to verify whether any message has been retrieved. If no message has been retrieved in the present polling process, the system ends, step 230. If one or more messages were retrieved, the agent 12 would proceed with a notification method preselected by the user, such as depositing a notification message in each polled mailbox, paging the user, or notifying the user at a designated location via telephone call or internet mail, step 240. Once the agent notifies the user of the pending messages, the system ends, step 230.

As can be seen, the present invention provides a simple solution to a universal messaging system which can retrieve all the various types of messages for the subscribers of the intelligent network messaging agent, save all the messages in a single mail repository for a later retrieval by the subscribers, and, most importantly, notify subscribers that there are messages waiting in their universal mailbox.

Although an illustrative preferred embodiment has been described herein in detail, it should be noted and will be appreciated by those skilled in the art that numerous variations may be made within the scope of this invention without departing from the principle of this invention and without sacrificing its chief advantages. For instance, while the present invention has been described above with respect to a single agent 12, it should be understood that agent 12 may comprise several agents acting cooperatively to carry out the functions of the intelligent network messaging agent.

The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A system for an intelligent network messaging agent for retrieving and consolidating messages from a predefined list of messaging services on behalf of a remote user comprising:

a server with a mail repository for retrieving a message from at least one of said messaging services and storing the message in the mail repository, for providing the remote user with a notification that the message has been retrieved, and for allowing the remote user to access the message in the mail repository through a customer interface;

a user database resident in said server containing a plurality of user records including a list of messaging services to which a remote user has subscribed and a preferred polling interval;

an application database resident in said server comprising a library of messaging service protocols to allow access to a message stored on a messaging service; and a memory for storing an indication that a message has been retrieved from a messaging service.

2. The system of claim 1 wherein the customer interface is a digital telephone.

3. The system of claim 2 wherein the intelligent network messaging agent is adapted to allow the user to listen to a text-to-speech version of an electronic mail message.

4. The system of claim 6 wherein the intelligent network messaging agent is adapted to allow the user to view a speech-to-text version of a voice message.

5. The system of claim 1 wherein the message is selected from the group consisting of voice messages and electronic mail messages.

6. The system of claim 1 wherein the customer interface is a personal computer.

7. The system of claim 1 wherein the notification is a notification message in the mailbox.

8. The system of claim 1 wherein the notification is a telephone message.

9. The system of claim 1 wherein the notification is a paging device message.

10. The system of claim 1 wherein the notification is an electronic mail message.

11. The system of claim 1 wherein the messaging service is an electronic mail repository.

12. The system of claim 1 wherein the messaging service is a local area network.

13. The system of claim 1 wherein the messaging service is a call answering service.

14. The system of claim 1 wherein the messaging service is a business voice messaging system.

15. The system of claim 1 wherein the messaging service is a home answering machine.

16. A method for an intelligent network messaging agent for retrieving and consolidating messages from a predefined list of messaging services on behalf of a remote user comprising:

retrieving a message from at least one of said messaging services into a mail repository in a server and storing the message in the mail repository;

providing the remote user with a notification that the message has been retrieved;

allowing the remote user to access the message in the mail repository through a customer interface;

storing a plurality of user records on a user database resident in said server, said plurality of user records including a list of messaging services to which a remote user has subscribed and a preferred polling interval;

storing a library of messaging service protocols on an application database resident in said server, and storing on a memory an indication that a message has been retrieved from a messaging service.

17. The method of claim 16 wherein the customer interface is a digital telephone.

18. The method of claim 17 wherein the intelligent network messaging agent is adapted to allow the user to listen to a text-to-speech version of an electronic mail message.

19. The method of claim 16 wherein the message is selected from the group consisting of voice messages and electronic mail messages.

20. The method of claim 16 wherein the customer interface is a personal computer.

21. The method of claim 16 wherein the intelligent network messaging agent is adapted to allow the user to view a speech-to-text version of a voice message.

22. The method of claim 16 wherein the notification is a notification message in the mailbox.

23. The method of claim 16 wherein the notification is a telephone message.

24. The method of claim 16 wherein the notification is a paging device message.

25. The method of claim 16 wherein the notification is an electronic mail message.

26. The method of claim 16 wherein the messaging service is an electronic mail repository.

27. The method of claim 16 wherein the messaging service is a local area network.

28. The method of claim 16 wherein the messaging service is a call answering service.

29. The method of claim 16 wherein the messaging service is a business voice messaging system.

30. The method of claim 16 wherein the messaging service is a home answering machine.

* * * * *